UNITED STATES PATENT OFFICE.

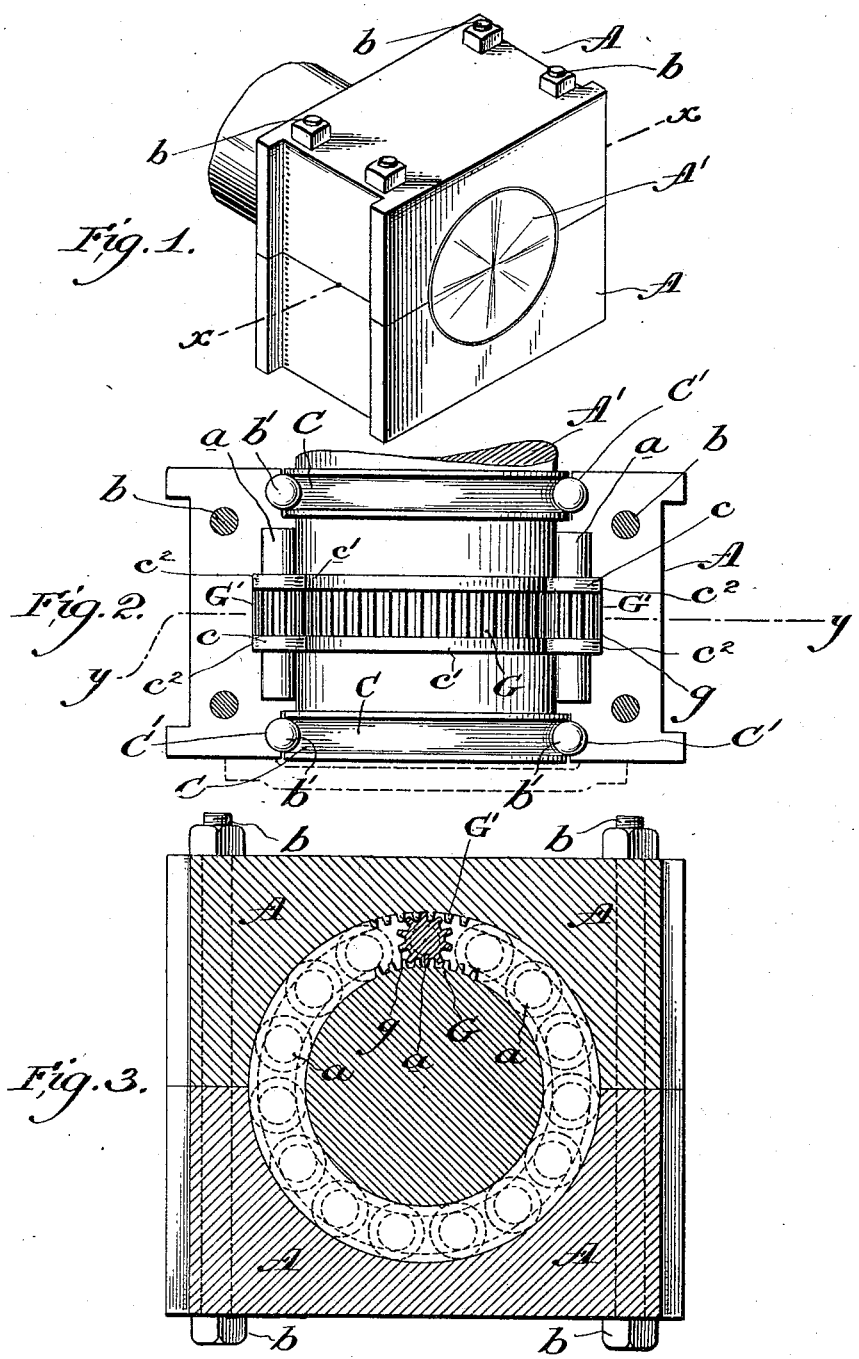

HARRY C. S. LUTZ, OF PHILADELPHIA, PENNSYLVANIA.

ROLLER-BEARING FOR JOURNALS.

SPECIFICATION forming part of Letters Patent No. 511,963, dated January 2, 1894.

Application filed June 16, 1893. Serial No. 477,827. (No model.)

*To all whom it may concern:*

Be it known that I, HARRY C. S. LUTZ, of the city of Philadelphia, State of Pennsylvania, have invented a certain new and useful Improvement in Roller-Bearings for Journals, &c.; and I do hereby declare the following to be a full, clear, and exact description thereof, reference being had to the accompanying drawings, forming part of this specification.

My invention has relation to roller bearings for journals, car boxes, machinery shafting, &c., and consists in the device hereinafter particularly described and claimed.

The object of my invention is to provide a roller bearing journal-box so constructed that the respective rollers circumferentially provided in series around the journal or axle will retain their normal relative position to each other without the liability of interfering with each other or with the smooth working of the bearings, and further to insure the constant, easy revolution of each roller without liability to slipping or sliding, and to obviate the wear and tear upon the box; a further object is to provide a construction of journal-box or axle bearing in which the necessity for the use of lubricating material is overcome and no lubricant required.

In the accompanying drawings, in which similar letters of reference refer to similar parts throughout, Figure 1 is a perspective view of my invention, represented as provided in the shape of a car axle box. Fig. 2 is a sectional view on the line $x$—$x$ of Fig. 1. Fig. 3 is a sectional view on the line $y$—$y$ of Fig. 2.

A represents the box or casing of the journal-bearing properly bolted or secured together, as by the bolts, $b$; the axle, A′, is horizontally journaled in the casing, A, upon a series of circumferentially disposed rollers, $a$, provided in a circular recess or bearing in the casing, A, of a width about equal to the length of the rollers, $a$, said rollers operating as an anti-frictional bearing for the axle, A′. The axle, A′, about midway in the casing, A, is provided with a series of serrations forming a gear wheel, G, and upon each roller is also provided a series of like serrations forming a smaller gear wheel, $g$, constructed to engage in the gearing, G, and in a circumferentially disposed rack, G′, provided on the inner circumference of the casing, A; each roller, $a$, is constructed with a collar, $c$, at each end of the serrations, $g$, to prevent the gearing of the adjoining rollers from interlocking in case of any accidental displacement of the rollers, the said collar, $c$, being of a circumference slightly greater than the circumference of the gearing, $g$, and playing in a groove, $c′$, circumferentially provided on the axle, A′, and in a groove, $c^2$, provided at each side of the rack, G′, as a clearance. In this construction the entire bearing of the axle, A′, will be upon the smooth ends of the rollers, as best illustrated in Fig. 2, as in ordinary roller bearing constructions, no weight or bearing of the axle being sustained on the line of the gearings. As the axle, A′, revolves on the bearings each roller, $a$, will be revolved by the gearing connection, G, $g$, and will be prevented from losing its relative position, or slipping, by the gearing connection, G. Each roller, $a$, has in this construction a positive gearing relation between the gear wheel, G, provided on the axle, A′, and the circumferential rack, G′, provided in the casing, A. I also preferably provide as an auxiliary balance-bearing two series of ball-bearings one at each end of the box or casing A, consisting of the circumferential groove, C provided on the axle, A′, circumferential groove, C′, oppositely provided in the casing, A, and series of balls, $b′$, provided in the grooves thus formed. By means of this construction of auxiliary bearing a true balance is secured and the correct relative position of the parts is more thoroughly maintained, though the invention may be successfully constructed and operated without this auxiliary ball-bearing construction.

In my improved journal bearings herein described the liability to heating is reduced to a minimum, and it may be successfully operated without the use of oil or other lubricating material.

The invention is especially adapted to journal-bearings for shafting, but is also applicable to all classes of journal-boxes, including car axles and other bearings.

Having thus described my invention, what I claim, and desire to secure by Letters Patent, is—

1. The combination with a grooved journal, having gear teeth, of a journal box having an interior circumferential bearing and a circular rack, and a series of rollers having teeth intermeshing with those of the journal and rack, and collar, c, at each end of said teeth, adapted to the grooved journal, substantially as specified.

2. The combination with a grooved journal, of a bearing box consisting of a grooved casing having an interior circumferential bearing, a series of rollers circumferentially disposed around said journal, between the journal and bearing, toothed gearing provided on said journal, toothed gearing provided on said rollers, intermeshing with the journal gearing, a circumferential rack provided in the bearing and having its teeth intermeshing with the roller gearing, and a series of balls in the grooves of the journal and bearing adapted to act as an auxiliary balance ball bearing for said journal, substantially as specified.

3. The combination with the journal, of a bearing box consisting of a casing having an interior circumferential bearing, a series of rollers circumferentially disposed around said journal, between the journal and bearing, a toothed rack provided at the center of said bearing, a series of gear teeth provided circumferentially upon said journal at a point directly opposite said rack, a series of gear teeth provided circumferentially upon each of the series of rollers, and intermeshing with the teeth of the journal and of the rack, said journal and casing being provided with oppositely disposed circumferential grooves at points beyond each end of the rollers, and a series of balls provided in said grooves as a bearing and balance for said journal, substantially as specified.

4. The combination with the journal, of a bearing box consisting of a casing having an interior circumferential bearing, a series of rollers, $a$, provided in said circumferential bearing around said journal, gearing, G, centrally provided upon said journal, circumferential rack, G', centrally provided in said casing opposite said gearing, G, gearing, $g$, centrally provided upon each of the rollers, $a$, engaging in said journal-gearing, G, and rack, G', collars, c, provided upon said rollers and adapted to fit within grooves, $c'$, $c^2$, provided in said journal and casing respectively, said journal and casing having grooves, C, C', respectively and balls, $b'$, provided therein as a bearing and balance for the journal, substantially as described.

In witness whereof I have hereunto set my hand this 21st day of December, A. D. 1892.

HARRY C. S. LUTZ.

Witnesses:
HORACE PETTIT,
J. BAYARD HENRY.

It is hereby certified that in Letters Patent No. 511,963, granted January 2, 1894, upon the application of Harry C. S. Lutz, of Philadelphia, Pa., for an improvement in "Roller-Bearings for Journals," an error appears in the printed specification requiring the following correction, viz: On page 1, in line 72, the reference letter "G" should be $G^1$; and that the said Letters Patent should be read with this correction therein that the same may conform to the record of the case in the Patent Office.

Signed, countersigned, and sealed this 16th day of January, A. D. 1894.

[SEAL.]
JNO. M. REYNOLDS,
*Assistant Secretary of the Interior.*

Countersigned:
JOHN S. SEYMOUR,
*Commissioner of Patents.*